US007170622B2

(12) United States Patent
Nobuhara et al.

(10) Patent No.: US 7,170,622 B2
(45) Date of Patent: Jan. 30, 2007

(54) IMAGE PROCESSING APPARATUS

(75) Inventors: Keiji Nobuhara, Yamatokoriyama (JP);
Koji Oku, Yamatokoriyama (JP);
Shinsaku Tohki, Tenri (JP); Masako Yoshinaga, Yamatokoriyama (JP);
Katsumi Nakanishi, Nara (JP);
Katsutoshi Ishikawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 875 days.

(21) Appl. No.: 10/076,364

(22) Filed: Feb. 19, 2002

(65) Prior Publication Data

US 2002/0171867 A1 Nov. 21, 2002

(30) Foreign Application Priority Data

May 17, 2001 (JP) ............................. 2001-147888
Nov. 16, 2001 (JP) ............................. 2001-351861

(51) Int. Cl.
*G06F 3/12* (2006.01)
*G06K 15/00* (2006.01)

(52) U.S. Cl. .................... 358/1.15; 358/1.13; 358/1.14

(58) Field of Classification Search ................ 358/1.1, 358/1.12, 1.13, 1.14, 1.15, 1.9, 1.16, 1.17
See application file for complete search history.

(56) References Cited

U.S. PATENT DOCUMENTS

| 5,317,345 | A | * | 5/1994 | Ueki et al. ................ 347/224 |
| 5,523,859 | A | * | 6/1996 | Nakajima et al. ........... 358/444 |
| 5,784,174 | A | * | 7/1998 | Fujino et al. ............... 358/404 |
| 5,791,790 | A | * | 8/1998 | Bender et al. ............... 400/61 |
| 5,832,331 | A | * | 11/1998 | Yoshida et al. ............. 399/43 |
| 5,897,252 | A | * | 4/1999 | Kanakubo ................... 400/74 |
| 6,016,386 | A | * | 1/2000 | Nosaki et al. ............. 358/1.15 |
| 6,369,914 | B1 | * | 4/2002 | Miura ...................... 358/403 |
| 6,483,602 | B1 | * | 11/2002 | Haneda .................... 358/1.16 |
| 6,937,363 | B1 | * | 8/2005 | Yamaguchi ................ 358/1.9 |

FOREIGN PATENT DOCUMENTS

| JP | 09-223061 | 8/1997 |
| JP | 09-284572 | 10/1997 |

* cited by examiner

*Primary Examiner*—Dov Popovici
(74) *Attorney, Agent, or Firm*—Birch, Stewart, Kolasch & Birch, LLP

(57) ABSTRACT

Image information input through an image information input device (e.g., image reader) is stored into an image information storage device (e.g., hard disk) and erased by an image information erasing device. A manager device (e.g., device controller) manages the status of an image processing apparatus and actuates the image information erasing device in accordance with the status of the image processing apparatus and erases the image information stored in the image information storage.

18 Claims, 14 Drawing Sheets

FIG. 3A
Display In Waiting Mode
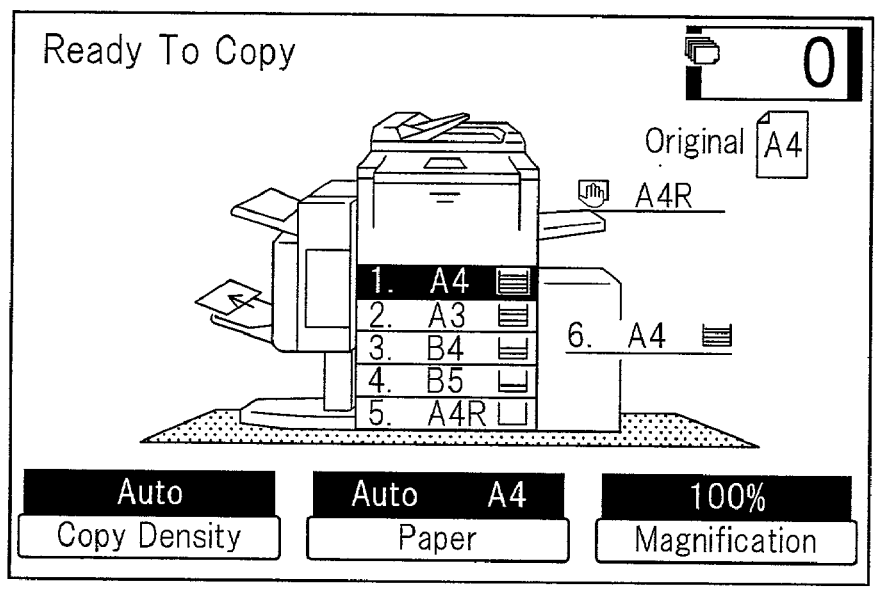
FIG. 3B
Display After Printing
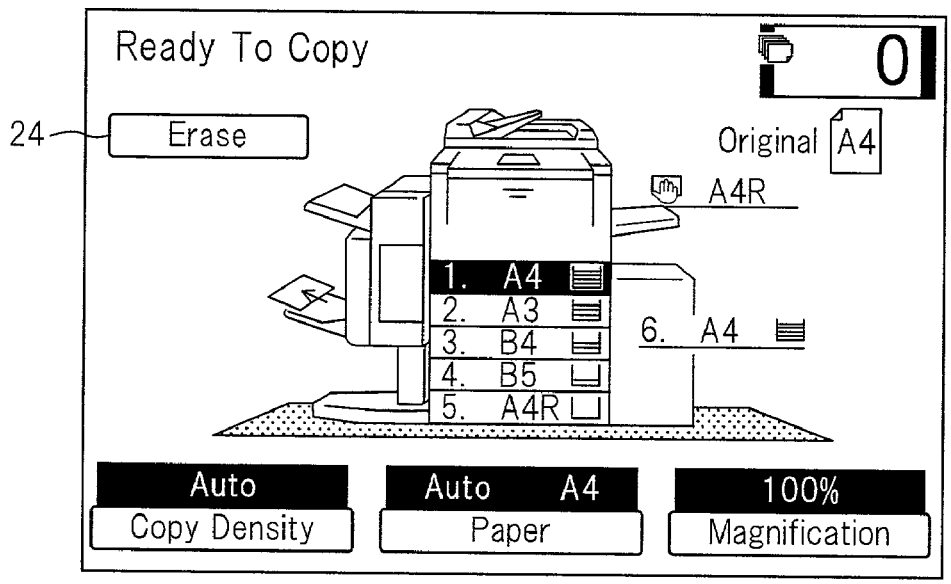

Copy Time Management Table

| Yesterday | 2days ago | 3days ago | 4days ago | ... | 6days ago |
|---|---|---|---|---|---|
| Power ON 7:50 | Power ON 7:55 | Power ON 7:50 | Power ON 7:53 | ... | Power ON 7:50 |
| Start 8:00 | Start 8:00 | Start 8:00 | Start 8:00 | ... | Start 8:00 |
| End 8:10 | End 8:10 | End 8:10 | End 8:10 | ... | End 8:10 |
| Start 9:30 | Start 9:30 | Start 9:30 | Start 9:30 | ... | Start 9:30 |
| End 9:50 | End 9:50 | End 9:50 | End 9:50 | ... | End 9:50 |
| : | : | : | : | | : |
| End 17:50 | End 18:10 | End 16:40 | End 17:30 | ... | End 17:10 |

FIG. 16

Idle Time Storage Table

| Yesterday | 2days ago | 3days ago | 4days ago | ... | 6days ago |
|---|---|---|---|---|---|
| 12:00 | 12:10 | 12:05 | 12:10 | ... | 12:00 |
| 13:00 | 13:10 | 13:14 | 13:10 | ... | 13:10 |

IMAGE PROCESSING APPARATUS

BACKGROUND OF THE INVENTION

(1) Field of the Invention

The present invention relates to an image processing apparatus such as a copier, printer, facsimile machine or a multifunctional machine consisting of these. In particular, the present invention relates to an image processing apparatus which can prevent leakage of the information processed thereby.

(2) Description of the Prior Art

Conventionally, there have been copiers(e.g., digital copiers) which scan image data of originals, and once stores it into a nonvolatile memory such as a hard disk or the like and reads out the image data as appropriate from that memory so as to print it out. Such a copier will continue to hold the image data of previously scanned originals even after its printing out until other originals are scanned next and the data is overwritten on the hard disk. Therefore, if the hard disk is taken out from the machine body and the stored data is analyzed, the information of the previously scanned image data may leak out. So this problem has been crucial especially when confidential information and the like are involved.

To deal with this problem, according to the technique disclosed in Japanese Patent Application Laid-Open Hei 9 No. 223061, a confidential document mode is introduced, in which the image data will be erased as soon as the process of the image data is completed. In another technique disclosed in Japanese Patent Application Laid-Open Hei 9 No. 284572, the image data is adapted to be erased while the machine is idle.

However, the erasing process of image data takes a definite time. In particular, in order to clear the stored image data from a rewritable disk memory medium(such as a hard disk, MO, CD-RW, DVD-RW), it may take about 0.7 seconds for an A4 sized image or about 70 seconds for image data of 100 pages in a case of a hard disk, though the time differs depending on the amount of data and the type and features of hardware(the device).

Since writing and reading of image data cannot be implemented while image data erasing is being executed, it is impossible to perform image data erasing in parallel with other processes. Accordingly, if data erasing is actuated without consideration of the usage condition of the image processing apparatus, the next process cannot be started until the image data erasing is completed. This leads to lowering of the processing efficiency.

SUMMARY OF THE INVENTION

The present invention has been devised in view of the above circumstances, it is therefore an object of the present invention to provide an image processing apparatus which is capable of preventing leakage of confidential information whilst maintaining the processing efficiency in an harmonious manner.

In order to achieve the above object, the present invention is configured as follows:

In accordance with the first aspect of the present invention, an image processing apparatus includes: an image information input means for receiving image information; an image information storage means for storing the image information input through the image information input means; an image processing means for processing the image information stored in the image information storage means; a status manager means for managing the status of the image processing apparatus; and an image information erasing means for erasing the image information stored in the image information storage means, and is characterized in that the image information erasing means is adapted to erase the image information in accordance with the status of the image processing apparatus managed by the status manager means.

In accordance with the second aspect of the present invention, the image processing apparatus having the above first feature further includes: an interrupt commanding means for giving an order of a job interrupt; and an interrupting job monitoring means for monitoring the status of the interrupting job directed by the interrupt commanding means, wherein the image information erasing means implements erasure of the image information in accordance with the interrupting job status monitored by the interrupting job monitoring means.

In accordance with the third aspect of the present invention, the image processing apparatus having the above second feature is characterized in that when the amount of information of the interrupting job monitored by the interrupting job monitoring means is lower than a preset amount, the image information erasing means erases the image information of the interrupting job stored in the image information storage means before return to the job before interruption; and when the amount of information of the interrupting job monitored by the interrupting job monitoring means exceeds the preset amount, the job before interruption is restored before erasing the image information of the interrupting job.

In accordance with the fourth aspect of the present invention, the image processing apparatus having the above second feature is characterized in that the image information erasing means is constructed such that whether the image information of the interrupting job stored in the image information storage means should be erased first before return to the job before interruption when the interrupting job monitoring means determines that the interrupting job has been completed or whether the job before interruption should be restored first before erasing the image information of the interrupting job, can be selected in advance.

In accordance with the fifth aspect of the present invention, the image processing apparatus having the above first feature is characterized in that the status manager means comprises a time counter means for measuring the inactive time in which the image processing apparatus is not operated by users, and the image information erasing means erases the image information stored in the image information storage means when the inactive time of the image processing apparatus based on the time measured by the time counter means exceeds a predetermined period.

In accordance with the sixth aspect of the present invention, the image processing apparatus having the above second feature is characterized in that the status manager means comprises a time counter means for measuring the inactive time in which the image processing apparatus is not operated by users, the time counter means starts counting from when the interrupting job monitoring means determines that the interrupting job has been completed, and the image information erasing means erases the image information stored in the image information storage means when the inactive time of the image processing apparatus based on the time measured by the time counter means exceeds a predetermined period.

In accordance with the seventh aspect of the present invention, the image processing apparatus having the above fifth feature is characterized in that the status manager means comprises an erase command accepting means for accepting a user's erase command for erasing the image information stored in the image information storage means, and the image information erasing means erases the image information stored in the image information storage means when the erase command accepting means receives an erase command, even if the inactive time of the image processing apparatus based on the measured time by the time counter means is determined not to exceed the predetermined period.

In accordance with the eighth aspect of the present invention, the image processing apparatus having the above second feature is characterized in that the status manager means comprises an erase command accepting means for accepting a user's erase command for erasing the image information stored in the image information storage means, the erase command accepting means accepts an erase command when the interrupting job monitoring means determines that the interrupting job has been completed, and the image information erasing means erases the image information stored in the image information storage means when the erase command accepting means receives an erase command.

In accordance with the ninth aspect of the present invention, the image processing apparatus having the above first feature is characterized in that the status manager means comprises a power source monitoring means for monitoring the status of the power source, and the image information erasing means erases the image information stored in the image information storage means, utilizing the period from the time when actuation of the power saving mode is monitored by the power source monitoring means to the time when the operation returns to the normal mode.

In accordance with the tenth aspect of the present invention, the image processing apparatus having the above second feature is characterized in that the status manager means comprises a power source monitoring means for monitoring the status of the power source, and the image information erasing means erases the image information stored in the image information storage means, utilizing the period from the time when actuation of the power saving mode is monitored by the power source monitoring means to the time when the operation returns to the normal mode.

In accordance with the eleventh aspect of the present invention, the image processing apparatus having the above first feature is characterized in that the status manager means comprises a cancel command accepting means for accepting a user's cancel command for canceling the operation of the image processing means, and the image information erasing means erases the image information stored in the image information storage means when the cancel command accepting means has received a cancel command.

In accordance with the twelfth aspect of the present invention, the image processing apparatus having the above second feature is characterized in that the status manager means comprises a cancel command accepting means for accepting a user's cancel command for canceling the operation of the image processing means, and the image information erasing means erases the image information stored in the image information storage means when the cancel command accepting means has received a cancel command.

In accordance with the thirteenth aspect of the present invention, an image processing apparatus includes: an image information input means for receiving image information; an image information storage means for storing the image information input through the image information input means; an image processing means for processing the image information stored in the image information storage means; an image information erasing means for erasing the image information stored in the image information storage means; and a time slot manager means for managing time slots in which the image information erasing means is to be operated.

In accordance with the fourteenth aspect of the present invention, the image processing apparatus having the above thirteenth feature is characterized in that the time slot manager means includes an operational status manager means which manages the operational status of the image processing apparatus during its activation to determine the time slots in which the image information erasing means is to be operated.

In accordance with the fifteenth aspect of the present invention, the image processing apparatus having the above thirteenth feature is characterized in that the time slot manager means sets up the time slots in which the image information erasing means is to be operated, based on the past operational log.

In accordance with the sixteenth aspect of the present invention, the image processing apparatus having the above fourteenth feature is characterized in that the time slot manager means sets up the time slots in which the image information erasing means is to be operated, based on the past operational log.

In accordance with the seventeenth aspect of the present invention, the image processing apparatus having the above thirteenth feature is characterized in that when the image information erasing means is inoperable, the time slot manager means waits to actuate the image information erasing means until the image processing apparatus permits the image information erasing means to operate.

In accordance with the eighteenth aspect of the present invention, the image processing apparatus having the above fourteenth feature is characterized in that when the image information erasing means is inoperable, the time slot manager means waits to actuate the image information erasing means until the image processing apparatus permits the image information erasing means to operate.

In accordance with the nineteenth aspect of the present invention, the image processing apparatus having the above fifteenth feature is characterized in that when the image information erasing means is inoperable, the time slot manager means waits to actuate the image information erasing means until the image processing apparatus permits the image information erasing means to operate.

According to the present invention, the image data stored in the image processing apparatus is automatically erased in accordance with the status of the image processing apparatus by image information erasing means. Further, in the present invention, the operation of the image information erasing means is managed by the time slot manager means so that the image data stored temporarily in the image processing apparatus can be automatically erased. This configuration makes it possible to erase the image information which has been temporarily stored for processing in the image processing apparatus, in a systematic manner, so that no information and data processed by the image processing apparatus will remain to the end. Therefore it is possible to prevent leakage of the information and data hence improve the standard of security. Further, since the previous data has been erased when a next user uses the image processing apparatus, there is no need to actuate an erasing process, so that it is possible to eliminate the inconvenience that the image processing apparatus cannot be used temporarily due to erasing of image data.

BRIEF DESCRIPTION OF THE DRAWINGS

FIGS. 3A and 3B are illustrative views showing display examples on the display portion at stages in a processing sequence;

FIG. 16 is an illustrative view for explaining the idle time storage table to be referred to in the learning mode.

DESCRIPTION OF THE PREFERRED EMBODIMENTS

The embodiment of an image processing apparatus according to the present invention will hereinafter be described with reference to the accompanying drawings.

Figure 1:
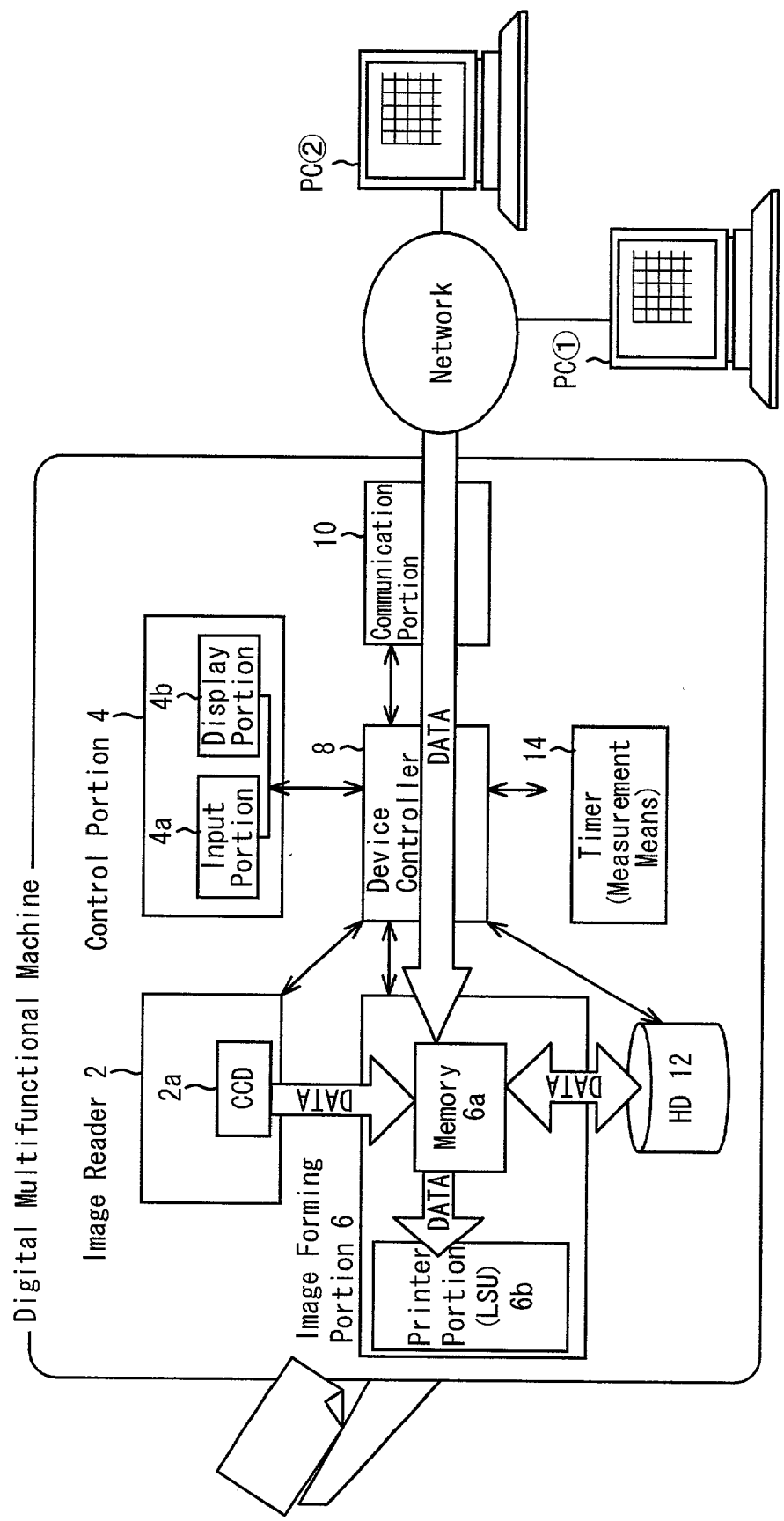
FIG. 1 is an illustrative view showing a schematic configuration of a digital copier as one embodiment of an image processing apparatus according to the present invention.

FIG. 1 is an illustrative view showing a schematic configuration of a digital multifunctional machine as one embodiment of an image processing apparatus according to the present invention.

The digital multifunctional machine according to the embodiment of the present invention includes: as shown in FIG. 1, an image reader(image information input means) 2, a control portion 4, an image forming portion (image information processing means) 6; a device controller 8; a communication portion(image information input means) 10, a hard disk(image information storage means) 12 and a timer 14.

When the digital multifunctional machine according to this embodiment is used as a copier, image data scanned by image reader 2 is output to image forming portion 6. Image reader 2 has a CCD 2a and is able to read image data from an original. The scanned image data is completed as an output image on a volatile memory 6a and temporarily stored into hard disk 12.

Then, the image data is sent back to volatile memory 6a and written into a printing portion 6b in synchronization with the write timing to printing portion 6b. When a multiple number of printouts are formed from the scanned image data, the image data is stored pagewise as output images into hard disk 12 and the data is sent out from hard disk 12 to volatile memory 6a, conforming to the designation of the output mode such as image mode, multi-shot mode, output transposition mode or the like and written into a printing portion 6b in synchronization with the write timing to printing portion 6b.

When the digital multifunctional machine according to this embodiment is used as a printer, image data received through communication portion 10 is output through image forming portion 6. Communication portion 10 is connected to a network so as to receive image data from personal computers on the network. The image data received by communication portion 10 is transferred pagewise as output images of data to memory 6a and temporarily stored into hard disk 12. Then the data is sent back to memory 6a from hard disk 12 and written into printing portion 6b similarly to the way the machine is used as a copier. Further, communication portion 10 is connected to the telephone line other then the network, whereby the digital multifunctional machine of the present embodiment can be operated as a facsimile machine in a similar manner.

Herein, the present invention will be described taking an example of a configuration including hard disk 12 for storing image data but should not be limited to this. That is, the present invention can be applied in the same way to a configuration including a non-volatile memory or memory device with a backup function which can retain the stored image data when it is removed from the machine body.

The components of the digital multifunctional machine according to the present embodiment is controlled by device controller 8. This device controller 8 also governs control portion 4 and timer 14.

Next, control portion 4 will be described in further detail with reference to FIG. 2.

Figure 2:
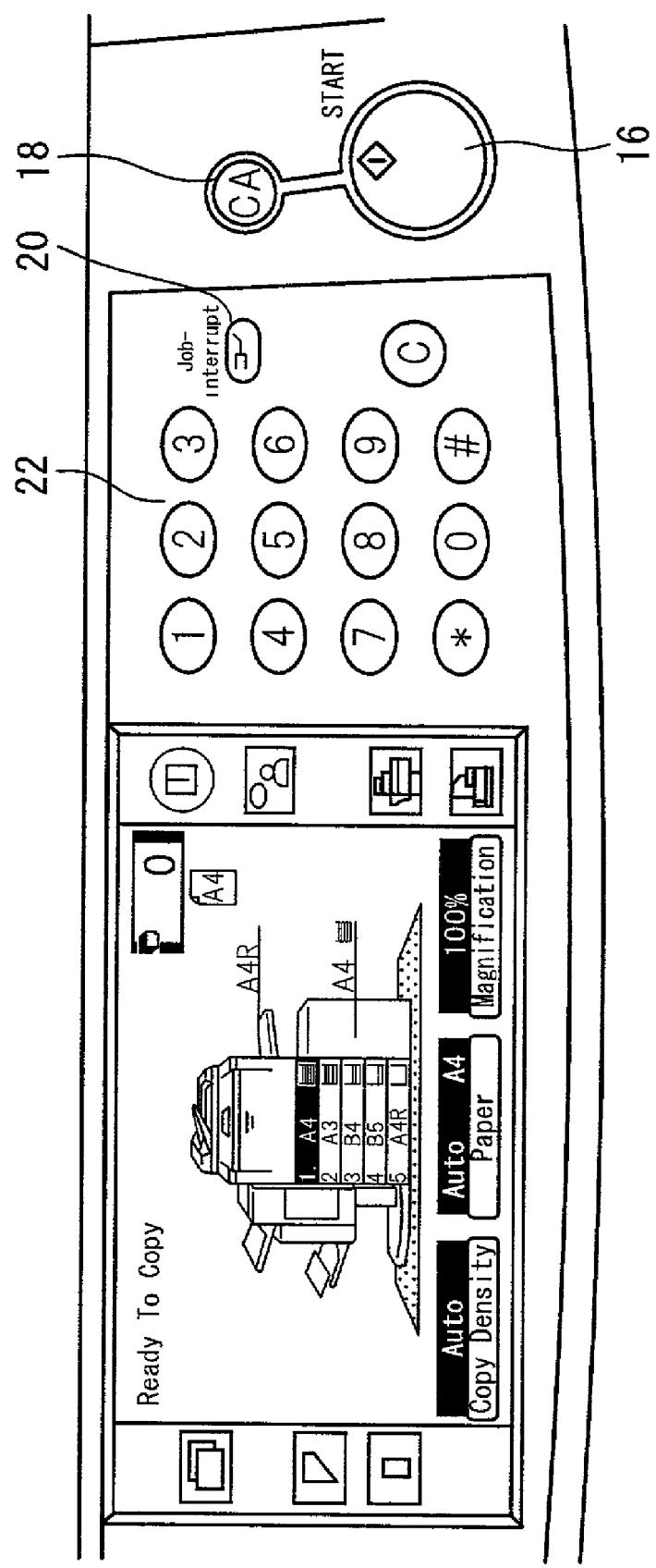
FIG. 2 is an illustrative view showing the control portion in detail.

FIG. 2 is an illustrative view showing control portion 4 in detail.

Control portion(control panel) 4 has an input portion 4a and display portion 4b as shown in FIG. 2. Display portion 4b is configured of a liquid crystal display panel so that information to be informed from the digital multifunctional machine according to the present embodiment to the user can be displayed. This liquid crystal display panel is of a touch-screen type and so can function as part of input portion 4a. Other than this, input portion 4a has a copy key 16 for commanding the start of copy, a cancel key(cancel command means) for canceling all the operations in progress, an interrupt key 20 for commanding actuation and cancel of a job interrupt and numeric keys 22 for instructing the number of copies and the like.

Timer (time counter means) 14 is to measure time of a period during which the digital multifunctional machine according to the present embodiment is kept in a predetermined state.

The aforementioned device controller 8, control portion 4 and timer 14 constitute the status control means. Further, device controller 8 has the function of image information erasing means for erasing designated pieces of image data on hard disk 12 by sending instructions to hard disk 12, the function of power source monitoring means for detecting the transition of the digital multifunctional machine according to the present embodiment into the power saving mode by monitoring the power source(not shown) of the digital multifunctional machine, and the function of interrupting job monitoring means for monitoring the status of the interrupting job when it is actuated.

Next, description will be made of a process for erasing the image data in hard disk 12 (to be referred to as 'image data erasing') after a copying operation which includes the steps of scanning originals, temporarily storing the image data into hard disk 12 and creating printouts based on the stored image data, in the digital multifunctional machine according to the present embodiment. Though the present invention will be described taking an example of a copying operation, a similar process is carried out in the case where the digital multifunctional machine according to the present embodiment is used as a printer or facsimile machine.

Figure 4:
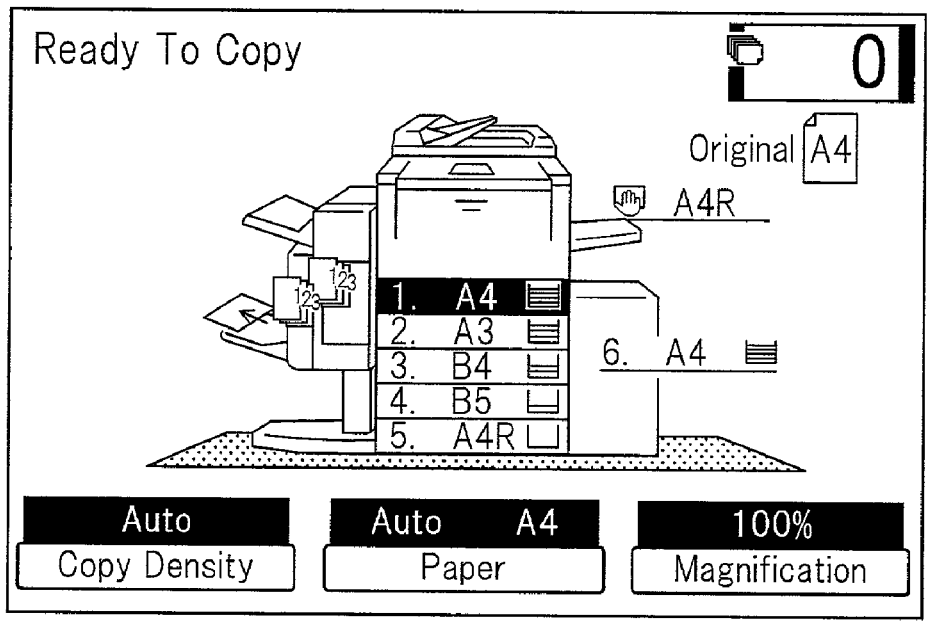
FIG. 4 is an illustrative view showing display examples on the display portion at a stage in a processing sequence.
Figure 5:
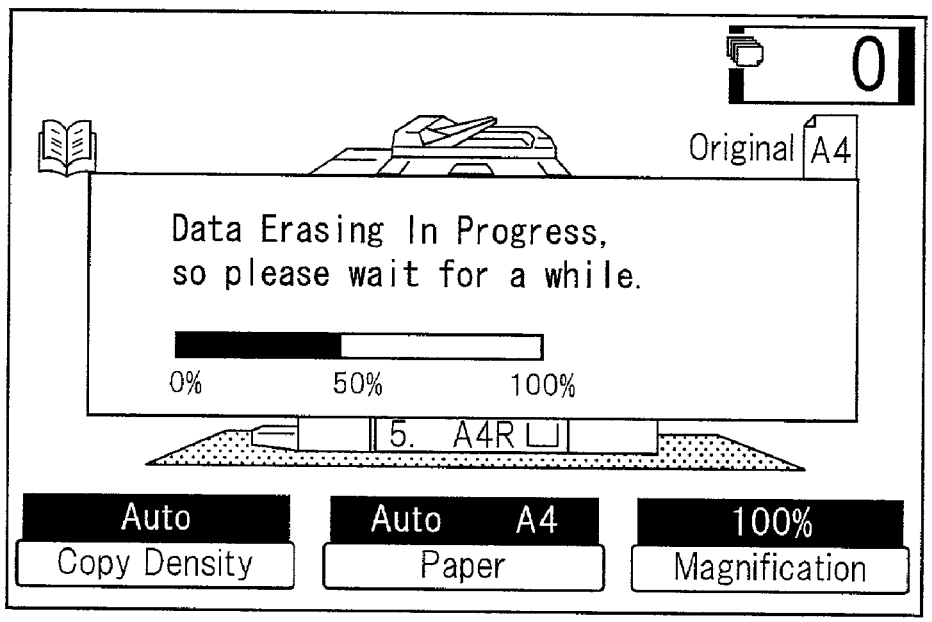
FIG. 5 is an illustrative view showing display examples on the display portion at a stage in a processing sequence.

FIGS. 3 to 5 show illustrative views showing display examples on display portion 4b in different processing sequences.

Figure 6:
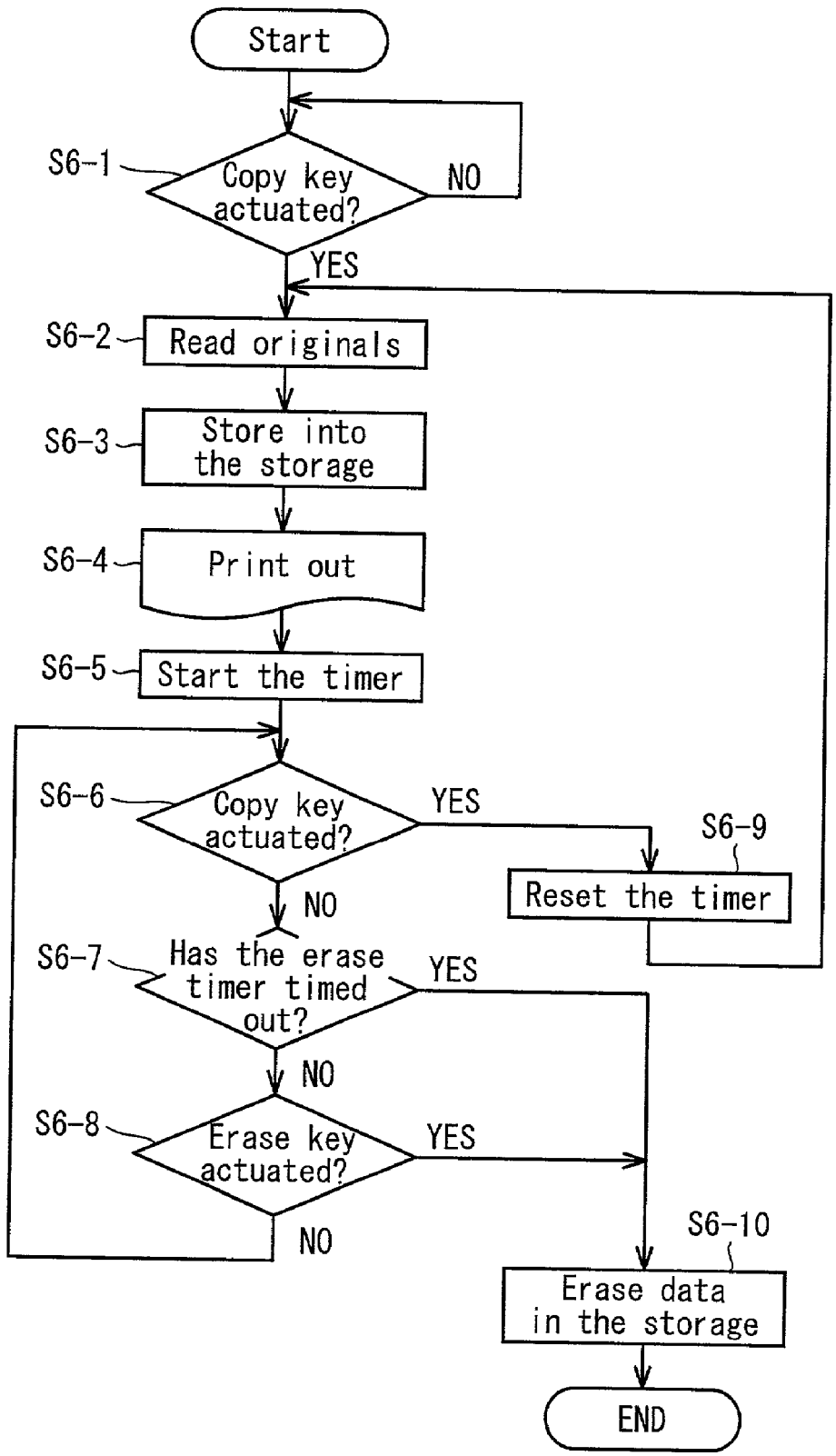
FIG. 6 is a flowchart showing an example of a processing sequence for erasing image data in the hard disk.

FIG. 6 is a flowchart showing an example of a processing sequence for erasing image data in hard disk 12 after a copying operation using the digital multifunctional machine according to the present embodiment.

When the digital multifunctional machine according to the present embodiment is in the waiting mode, display portion 4b presents the display shown in FIG. 3A. To actuate a copying operation from this state, copy key 16 is pressed (S6-1) as shown in FIG. 6. Once the copy key is operated, image reader 2 starts to pick up the image data from an original(S6-2) and the scanned image data is temporarily stored into hard disk 12(S6-3). Then the stored image data is read out and printed out by image forming portion 6(S6-4). During printing of the image data, display portion 4b presents the display shown in FIG. 4.

When printing is completed, timer 14 starts to measure the lapse time after the completion of printing(start the erase timer) and an erase starting command key(erase command means) 24 is added on display 4b as shown in FIG. 3B(S6-5). This erase starting command key 24 is an input key for commanding erasure of image data in hard disk 12 to the digital multifunctional machine according to the present embodiment and is to allow the user to directly command erasing of data.

Thereafter, the operation enters the loop of Steps 6(S6-6) to 8(S6-8). In this loop, whether copy key 16 is actuated again, whether the measurement of time on timer 14 exceeds the predetermined time(to be referred to as 'retention time') (whether the erase timer has timed out) and whether erase starting command key 24 is pressed, are sequentially checked until any one of these determination results presents 'YES'. Here, the time which is expected to be required from the end of the preceding job to the start of a subsequent job when the digital multifunctional machine according to the present embodiment is used consecutively by an identical user or different users, is set as the retention time. Specifically, this time is about some tens seconds. Further, the retention time may be set at a desired time beforehand through the setup frame allowing for operation setup of the digital multifunctional machine. In this case, erasing can be started after the lapse of the set time.

In this loop, when it is determined that copy key 16 has been pressed, this means that a next job is commanded before the lapse of the retention time. That is, the digital multifunctional machine according to the present embodiment is used consecutively. If, in this case, an image data erasing process is tried to be done, the next job cannot be started until this image data erasing process is completed. This is inconvenience for the user who needs to effect the next job. Therefore, in this case the erase timer is reset(S6-9) without implementing image data erasing and the operation goes to Step 2(S6-2).

When it is determined that the erase timer has timed out, the digital multifunctional machine according to the present embodiment is considered that it will not be used consecutively. In this case, there is still a possibility that the digital multifunctional machine according to the present embodiment might be used immediately after this by another user, but this possibility is relatively low compared to the case of the machine being used consecutively. Therefore, actuation of image data erasing does not always cause inconvenience to users. Hence, when it is determined that the erase timer has timed out, image data erasing is implemented first(S6-10) before the operation returns to the waiting mode.

When it is determined that erase start command key 24 has been pressed, image data erasing is effected first (S6-10) respecting the user's decision before the operation returns to the waiting mode. Accordingly, it is possible for a user to prevent leakage of confidential information by pressing erase start command key 24 after when information of a high confidentiality has been processed.

While the image data erasing process is being implemented, display portion 4b presents the display of asking the user to wait until the image data erasing process is completed, with the percentage of completion of the image data erasing process.

Figure 7:
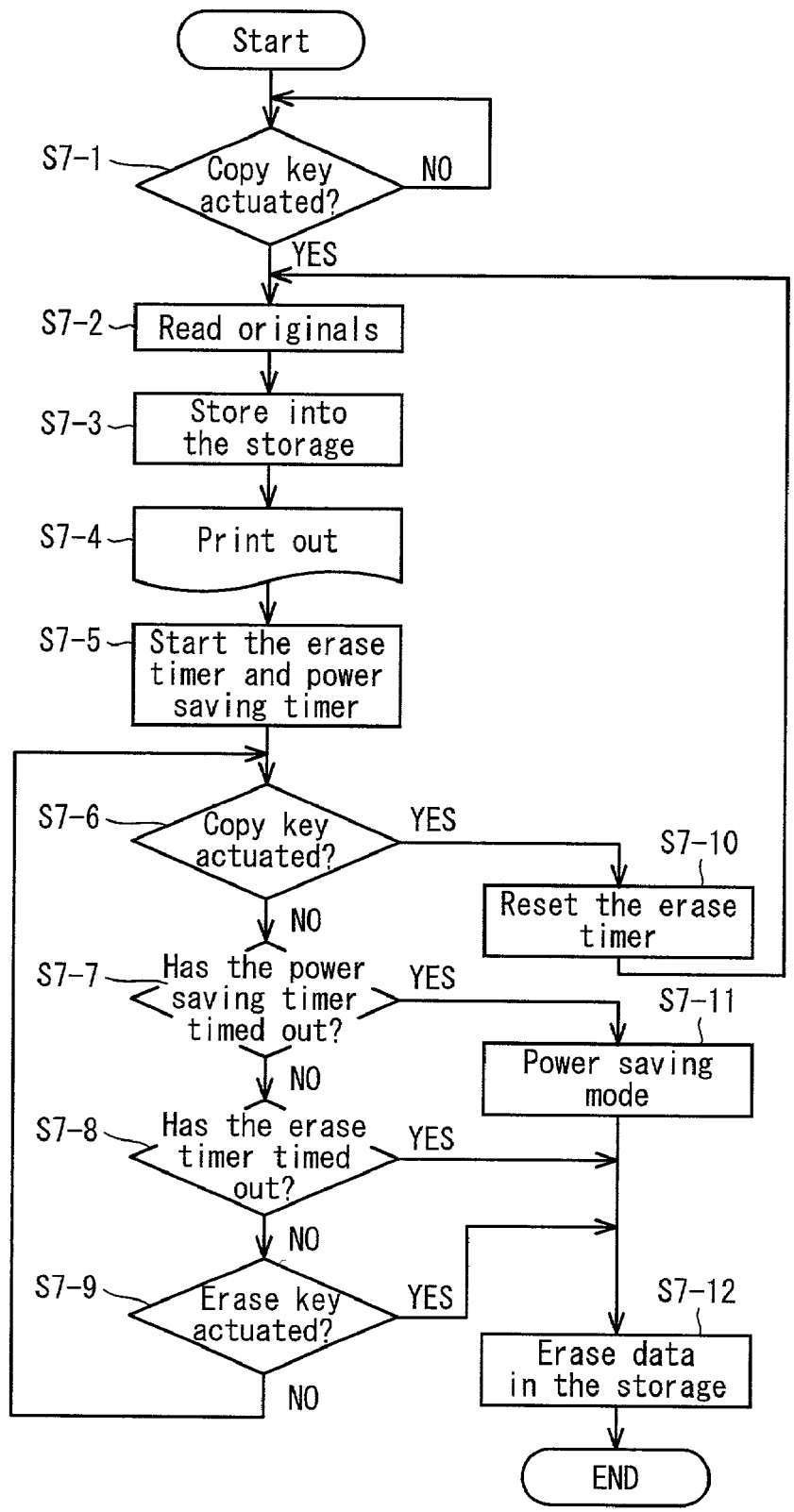
FIG. 7 is a flowchart showing another example of a processing sequence for erasing image data in the hard disk.

FIG. 7 is a flowchart showing another example of a processing sequence for erasing the image data in hard disk 12 after a copying operation using the digital multifunctional machine according to the present embodiment.

The difference of the sequence shown in FIG. 7 from that shown in FIG. 6 is that in addition to the judgement as to whether the erase timer has timed out, it is checked whether the time for actuating the energy saving mode(power saving mode)(to be referred to as 'energy saving mode start time') has lapsed(whether the power saving timer has timed out). That is, this judgement is made at Step 7(S7-7), and when it is determined that the power saving timer has timed out, the operation is made to transit to the power saving mode(S7-11), and the image data erasing process is actuated(S7-12).

Other steps (S7-1 to S7-6, S7-8 to S7-9) are the same as those shown in FIG. 6, so the detailed description is omitted.

In the power saving mode, the process of printing and the like cannot be implemented, and it takes a definite time to return from the power saving mode to the normal mode. Therefore, by actuating image data erasing as soon as the operation is made to transit to the power saving mode, it is possible to execute image data erasing, utilizing the time in the power saving mode or the time taken for return from the power saving mode to the normal mode.

Figure 8:
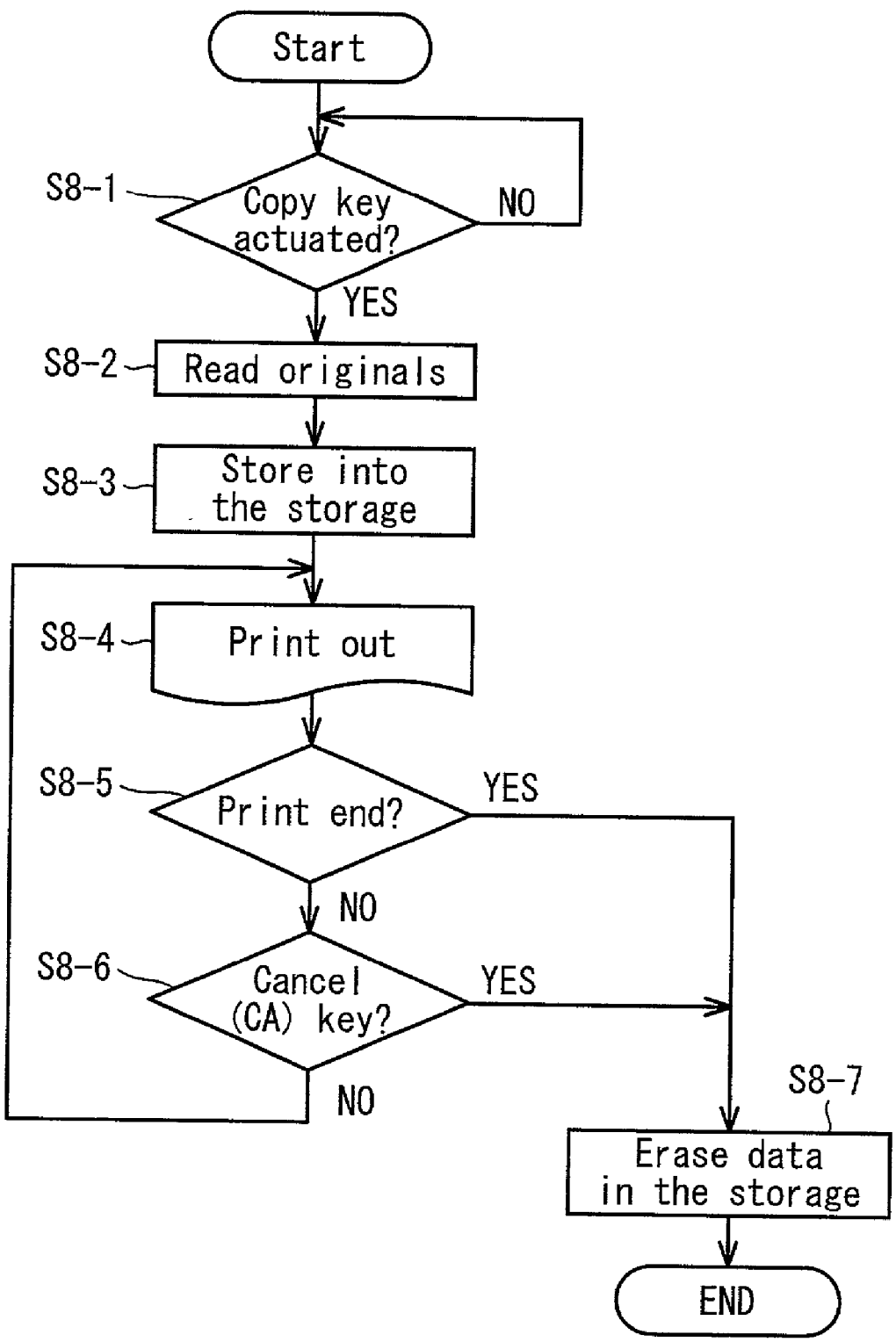
FIG. 8 is a flowchart showing a process when a job in progress is cancelled.

FIG. 8 is a flowchart showing an example of a processing sequence wherein while a copy job of multiple pages is being implemented in the digital multifunctional machine according to the present embodiment a cancel key 18 in input portion 4a is pressed by the user so that the job in progress is cancelled.

In the sequence shown in FIG. 8, similarly to the sequence shown in FIG. 6, when copy key 16 is pressed(S8-1), the image data of originals is scanned(S8-2) and the scanned image data is temporarily stored into hard disk 12(S8-3). Then the stored image data is read out and printed out(S8-4). The process downstream of the start of printing forms a loop such that whilst printing is being performed, whether printing is completed(S8-5) and whether cancel key 18 is pressed (S8-6) are checked successively and this loop is continued until any one of these determination results presents 'YES'.

When the printing is completed or cancelled by pressing cancel key 18, image data erasing is actuated(S8-7) and the operation returns to the waiting state.

Figure 9:
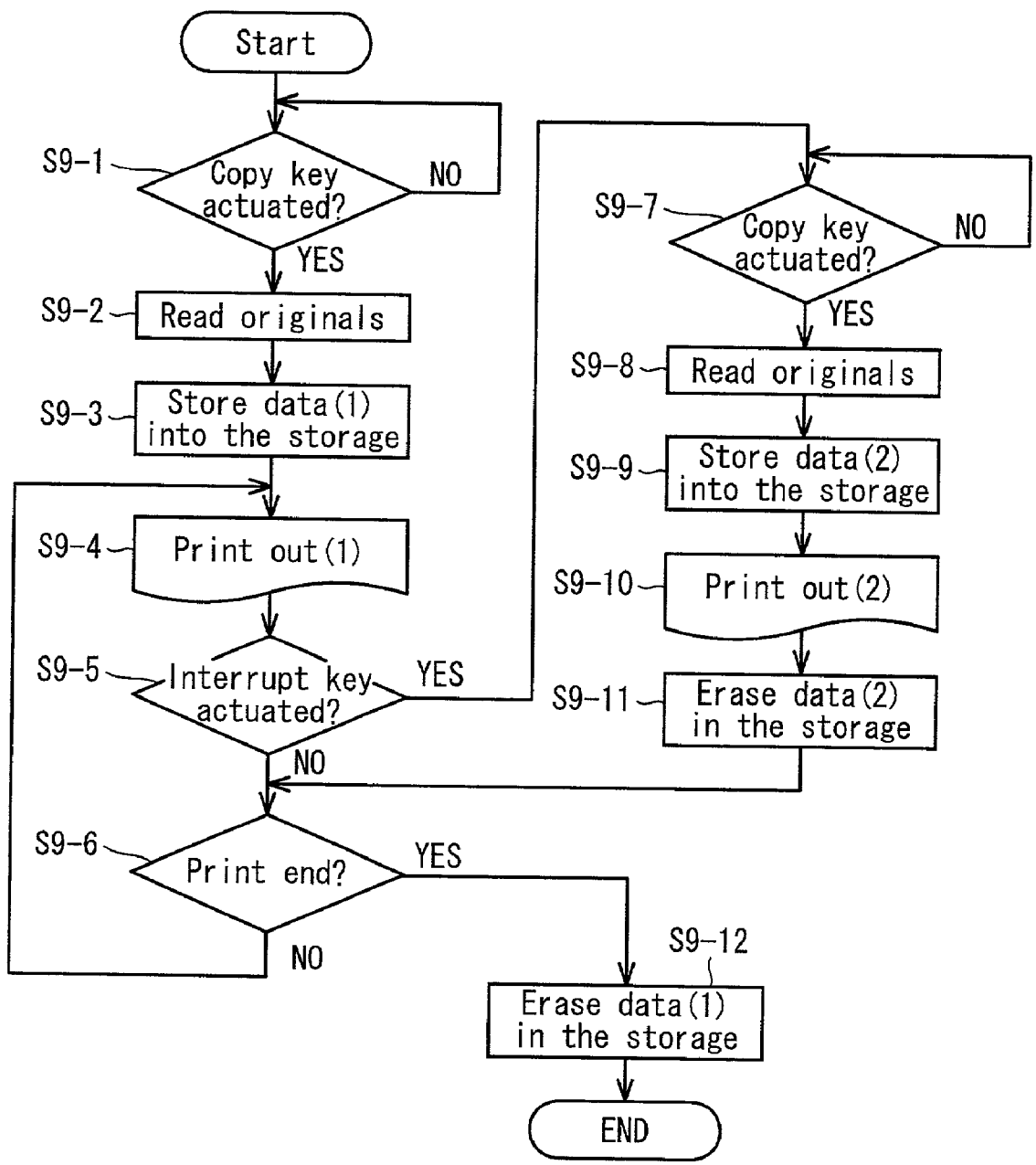
FIG. 9 is a flowchart showing an example of a processing sequence when a job interrupt is actuated.

FIG. 9 is a flowchart showing an example of a processing sequence when a job interrupt is actuated in the digital multifunctional machine according to the present embodiment.

In the sequence shown in FIG. 9, similarly to the sequence shown in FIG. 6, when copy key 16 is pressed(S9-1), image data of originals is scanned(S9-2) and the scanned image data is temporarily stored into hard disk 12(S9-3). Then the stored image data(to be referred to as 'image data 1' hereinbelow) is read out and printed out(S9-4). Here, the printing operation before interruption is referred to as 'printing operation 1'. The process downstream of the start of printing operation 1 (S9-4) forms a loop such that whilst printing is being performed, whether interrupt key 20 is pressed (S9-5)and whether the printing is completed (S9-6) are checked successively and the loop is continued until any one of these determination results presents 'YES'.

When interrupt key 20 is pressed, 'printing 1(S9-4)' is temporarily stopped in order to allow for an interrupting job. When copy key 16 is pressed(S9-7) for another job, image data of originals is scanned(S9-8) and the scanned image data is temporarily stored into hard disk 12(S9-9). Then the stored image data(to be referred to as 'image data 2' hereinbelow) is read out and printed out(S9-10). 'Image data 2' stored for this job is stored at an area other than that of 'image data 1' in hard disk 12. And the printing operation for this interrupting job is referred to as 'printing operation 2'.

When printing operation 2(S9-10) is completed, the image data erasing process for 'image data 2' is implemented(S9-11) and the operation returns to 'printing operation 1(S9-4)'. When 'printing operation 1(S9-4)' is completed, the image data erasing process for 'image data 1' is implemented(S9-12) to end the sequence.

Figure 10:
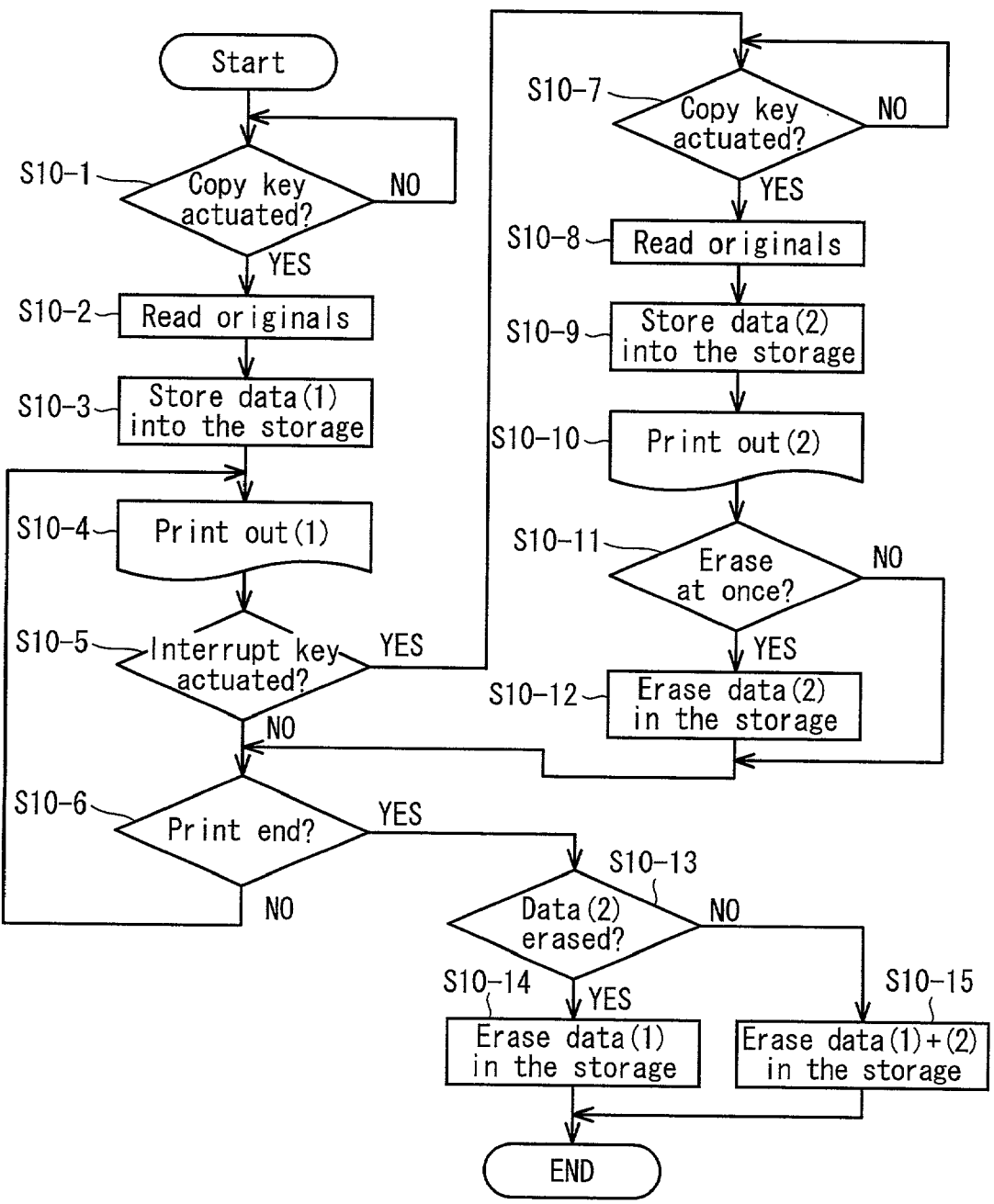
FIG. 10 is a flowchart showing another example of a processing sequence when a job interrupt is actuated.

FIG. 10 is a flowchart showing another example of a processing sequence when a job interrupt is actuated in the digital multifunctional machine according to the present embodiment.

The difference of the sequence shown in FIG. 10 from that shown in FIG. 9 resides in that it is checked whether the image erasing process for 'image data 2' should be implemented immediately(S10-11), after the completion of 'printing operation 2(S10-10)' and in that it is checked whether the image data erasing process for 'image data 2' has been implemented (S10-13), after the completion of 'printing operation 1(S10-4)' and when it has been already done, the image data erasing process for 'image data 1' only is implemented(S10-14), and when it has not yet done, the image data erasing process for both 'image data 1' and 'image data 2' is implemented(S10-15).

Here, whether the image data erasing process for 'image data 2' should be done at once (S10-11) can be determined as follows, for example.

That is, whether the image data erasing process for 'image data 2' should be done at once can be determined based on the amount of information of 'image data 2'. When the amount of information 'image data 2' is greater than a preset value, a relatively long time is needed for the image data erasing process implemented for 'image data 2'. Therefore, in this case the image data erasing process is adapted not to be done at once (skipping S10-12). On the other hand, when the amount of information 'image data 2' is not greater than the preset value, the image data erasing process for 'image data 2' can be implemented in a relative short time. Therefore in this case, the image data erasing process is implemented at once(S10-12). This improves the standard of security. In this way, it is possible to realize prevention against lowering in processing efficiency and improvement in security standard in a harmonized manner by selecting the preset value appropriately.

Alternatively, it is possible to previously set whether image data erasing should be done at once or not, for the individual digital multifunctional machine of the present embodiment and determine it based on that setup. This setup may and should be done properly, based on the usage status and the like of the digital multifunctional machine according to the present embodiment, for example, whether information of high confidentiality is often processed, taking into consideration the priorities of prevention against lowering in processing efficiency and improvement in security standard.

As another option, whether the image data erasing process for 'image data 2' should be done at once may be asked to the user at the end of 'printing operation 2(S10-10)' and based on the user's decision through the aforementioned erase start command key 24, it can be determined(S10-11). In this case, it is possible for the user to definitely instruct whether the image data erasing process should be performed at once based on the confidentiality or the like of the information processed by the user.

It is also possible to configure the system such that measurement of the lapse time is started when 'printing operation 2'(S10-10) ends, and when it is determined that the lapse time exceeds the predetermined period before returning to 'print operation 1'(S10-4), the image data erasing process for 'image data 2'(S10-12) is actuated and then the operation automatically will return to 'printing operation 1'(S10-4).

The transition from 'printing operation 2(S10-10) to 'printing operation 1'(S10-4) is usually actuated by pressing job interrupt key 20 once again. When job interrupt key 20 is not pressed after the predetermined time has lapsed from the end of 'printing operation 2'(S10-10), it is considered that the user may have forgotten to press job interrupt key 20. In such a case, the above-described arrangement of automatic returning to 'printing operation 1'(S10-4) makes smooth transition possible as well as improving the standard of security while inhibiting lowering of the processing efficiency of the image processing apparatus.

Other steps (S10-1 to S10-10) are the same as the above sequence shown in FIG. 9, hence the detailed description is omitted.

Next, description will be made of an embodiment in which a time slot manager means is provided to manage the operation of the image data erasing means so as to automatically erase the image data temporarily stored in the image processing apparatus.

As described heretofore, in order to inform the user that erasing of the image data in hard disk 12 is in progress, display portion 4b of control portion 4 displays the status that the image data is being erased, together with its percentage of completion, as shown in FIG. 5. In this way, the digital multifunctional machine cannot handle and store the images of new originals while an image data erasing process is being implemented or it becomes operable only when the image data erasing process has been completed hundred-percent.

Figure 11:
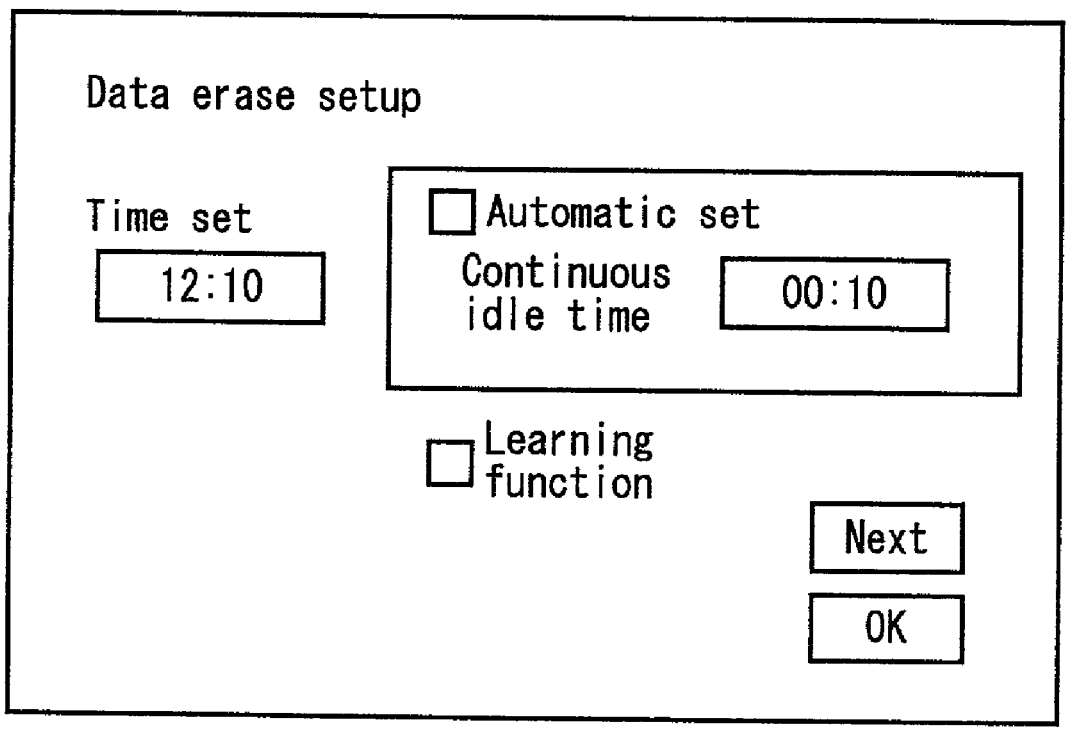
FIG. 11 is an illustrative view showing a display example in the display portion for setting the time when image data erasing is to be implemented.

FIG. 11 is an illustrative view showing a display example in display portion 4b for setting the time when image data erasing is to be implemented.

In order to set the time when image data erasing is to be performed, in accordance with the on-site conditions, the user makes the setup frame active on display portion 4b. As shown in FIG. 11, this setup frame has a setup box of the time when image data erasing is to be performed, on the left side thereof and has a set up box of the idle time(the time in which the apparatus continues to be in the waiting mode) for implementing image data erasing, at the upper right therein. The setup frame further has a setup box for the learning function for learning the timing when image data erasing is to be performed, at the lower right therein. When the learning function is made active through this leaning function setup box, the apparatus gains the knowledge of the time when image data erasing is to be performed in accordance with the operational status of the digital multifunctional machine and actuates image data erasing at the thus determined suitable timing.

The selection and time set of the automatic setup mode and the learning function mode can be made sequentially using the 'NEXT' key and the 'OK' key at the lower right in the frame and numeric keys 22 arranged in control portion 4 and others.

Figure 12:
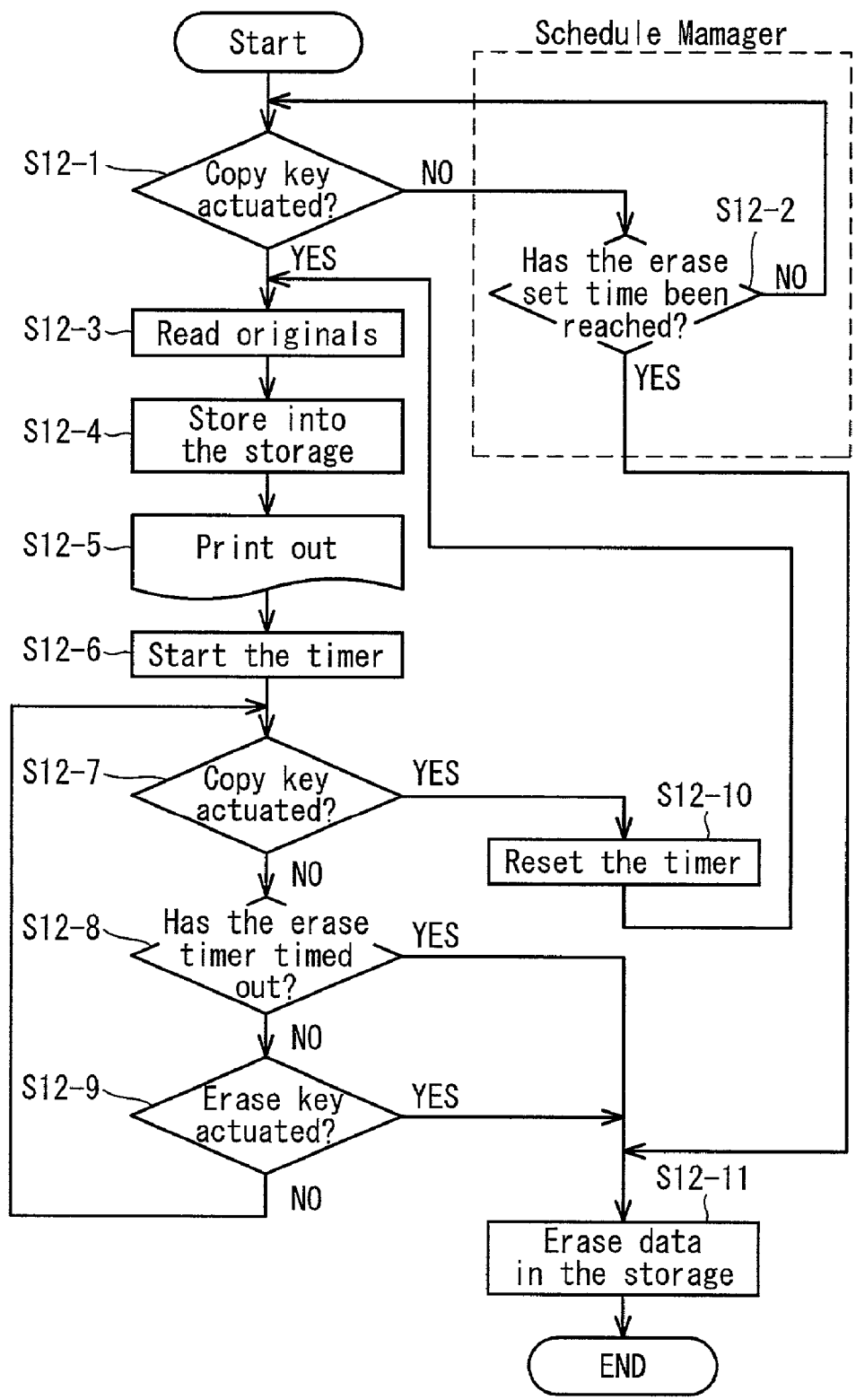
FIG. 12 is a flowchart showing an example of a processing sequence of erasing image data in the hard disk in the time set mode and in the idling mode.

FIG. 12 is a flowchart showing an example of a processing sequence of erasing the image data in hard disk 12(in the time set mode and in the idling mode) after a copying operation with the digital multifunctional machine according to the present embodiment.

When the digital multifunctional machine according to the present embodiment is in the waiting mode, display portion 4b presents the display shown in FIG. 2. To actuate a copying operation from this state, copy key 16 is pressed (S12-1) as shown in FIG. 12. Once the copy key is operated, image reader 2 starts to pick up the image data from an original(S12-3) and the scanned image data is temporarily stored into hard disk 12(S12-4). Then the stored image data is read out and printed out by image forming portion 6(S12-5). During printing of the image data, display portion 4b displays a message 'Copy in progress' on the upper left therein.

When printing is completed, timer 14 starts to measure the lapse time after the completion of printing(start the erase timer) and an erase start command key(erase command means) 24 is added at the upper left on display 4b(S12-6). This erase start command key 24 is an input key for commanding erasure of image data in hard disk 12 to the digital multifunctional machine according to the present embodiment and is to allow the user to directly command erasing of data.

Thereafter, the operation enters the loop of Steps 7(S12-7) to 9(S12-9). In this loop, whether copy key 16 is actuated again, whether the measurement of time on timer 14 exceeds the predetermined time(to be referred to as 'retention time') (whether the erase timer has timed out) and whether erase start command key 24 is pressed, are sequentially checked until any one of these determination results presents 'YES'. Here, the time which is expected to be required from the end of the preceding job to the start of a subsequent job when the digital multifunctional machine according to the present embodiment is used consecutively by an identical user or different users, is set as the retention time. Specifically, this time is about some tens seconds. Further, the retention time may be set at a desired time beforehand through the setup frame allowing for operation setup of the digital multifunctional machine. In this case, erasing can be started after the lapse of the set time.

In this loop, when it is determined that copy key 16 has been pressed, this means that a next job is commanded before the lapse of the retention time. That is, the digital multifunctional machine according to the present embodiment is used consecutively. If, in this case, an image data erasing process is tried to be done, the next job cannot be started until this image data erasing process is completed. This is inconvenience for the user who needs to effect the next job. Therefore, in this case the erase timer is reset(S12-10) without implementing image data erasing and the operation goes to Step 3(S12-3).

When it is determined that the erase timer has timed out, the digital multifunctional machine according to the present embodiment is considered that it will not be used consecutively. In this case, there is still a possibility that the digital multifunctional machine according to the present embodiment might be used immediately after this by another user, but this possibility is relatively low compared to the case of the machine being used consecutively. Therefore, actuation of image data erasing does not always cause inconvenience to users. Hence, when it is determined that the erase timer has timed out at Step 8(S12-8), image data erasing is implemented first(S12-11) before the operation returns to the waiting mode.

When it is determined that erase start command key 24 has been pressed at Step 9(S12-9), image data erasing is effected first (S12-11) respecting the user's decision before the operation returns to the waiting mode. Accordingly, it is possible for a user to prevent leakage of confidential information by pressing erase start command key 24 after when information of a high confidentiality has been processed.

The digital multifunctional machine according to the present embodiment also has a schedule manager and starts to effect image data erasing automatically(S12-11) when the predetermined time, designated through the setup frame already described referring to FIG. 11, is reached(S12-2). In this course of processing, if the digital multifunctional machine is engaged when the designated time is reached, image data erasing should be started after the completion of the operation in progress.

While the image data erasing process is being implemented, display portion 4b presents the display of asking the user to wait until the image data erasing process is completed, with the percentage of completion of the image data erasing process, as shown in FIG. 5.

Figure 13:
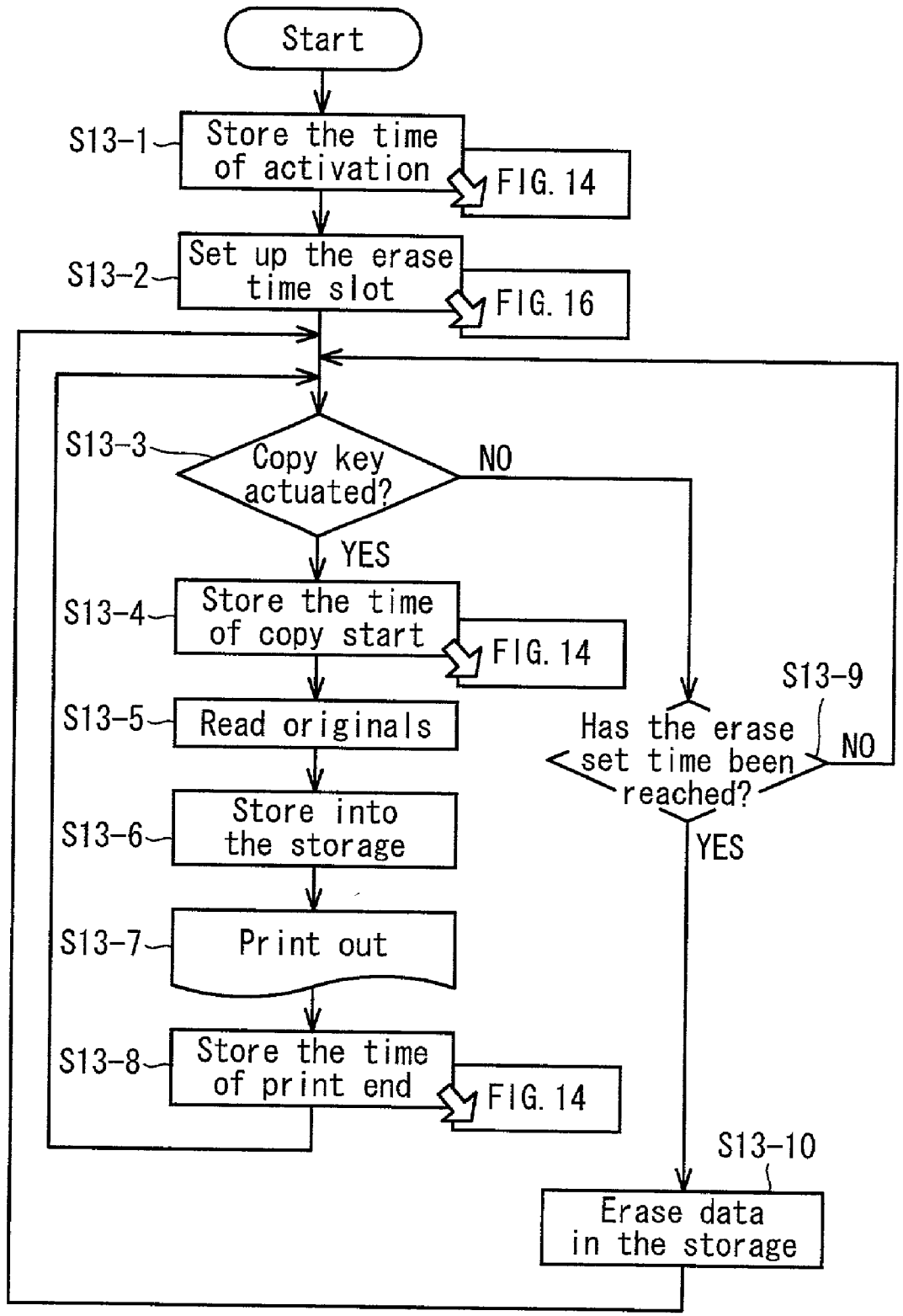
FIG. 13 is a flowchart showing an example of a processing sequence of erasing image data in the hard disk in the learning mode.
Figures 14, 15:
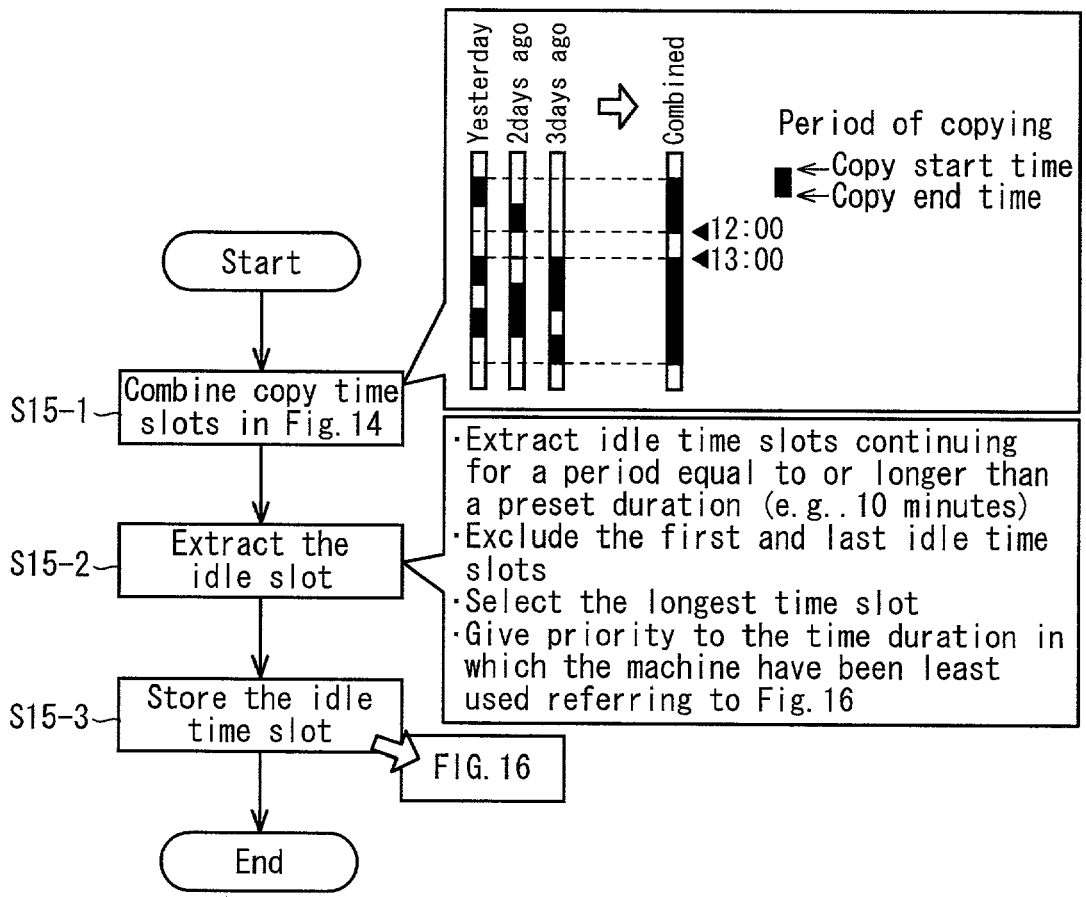
FIG. 14 is an illustrative view for explaining the copy time management table to be referred to in the learning mode.
FIG. 15 is a flowchart showing a detailed processing sequence of setting erasing time slot in the learning mode.

FIGS. 13 and 15 are flowcharts showing another example of a processing sequence of erasing the image data in hard disk 12 after a copying operation with the digital multifunctional machine according to the present embodiment. FIGS. 14 and 16 are illustrative views for explaining the copy time management table and idle time storage table respectively, to be referred to in the learning mode.

The sequence of image data erasing shown in FIG. 13 is to manage the operational log of the starting time, job-actuated times (usage conditions) and the like of the digital multifunctional machine and automatically set up the actuation timing of image data erasing based on that information.

For image data erasing in the learning mode, the operational status from when the digital multifunctional machine is activated to when it is deactivated, or the operational status of the digital multifunctional machine in its operable state is monitored and managed as the activity log information, based on the copy time management table shown in FIG. 14.

Specifically, as shown in FIG. 13, the period during which the digital multifunctional machine is activated is stored into the table shown in FIG. 14(S13-1), and the erase mode actuation time of that day is determined based on the past operational log so that the idle time is stored into the table shown in FIG. 16(S13-2).

In this setup step(S13-2) for determining the erase time slot, the time slots during which the machine is engaged for copying, stored in the table of FIG. 14 are superimposed as shown in FIG. 15(S15-1) so as to extract the idle time(S15-2) and the thus extracted time slot is stored into the table of FIG. 16(S15-3). Extraction of the idle time slot is carried out by extracting the time slots continuing for a period longer than a preset duration (e.g., 10 minutes) and selecting the longest idle time slot except the first and last time slots, giving priority to the time duration in which the machine have been least used, with reference to the table shown in FIG. 16.

When setup of the erase time slot is completed(S13-2), the operation enters the loop of Steps 3(S13-3) to 8(S13-8). In this loop, once copy key 16 is pressed(S13-3), the copy start time is stored into the table of FIG. 14(S13-4) and image reader 2 starts to pickup the image data from an original (S13-5) and the scanned image data is temporarily stored into hard disk 12(S13-6). Then the stored image data is read out and printed out by image forming portion 6(S13-7) and the end time of the printing is stored into the table of FIG. 14(S13-8).

When the set erase time is reached before copy key 16 is pressed(S13-9), the image data in hard disk 12 is erased (S13-10).

Though the idle time storage table shown in FIG. 16 has idle time slots around lunchtime only for easy understanding, if there are a multiple number of idle time slots from the activation to deactivation of the digital multifunctional machine, the timing of implementing image data erasing may be determined by detailed management of these time slots.

By the implementation of the above processing sequence, it is possible to erase the image data in hard disk 12 at a definite time if the digital multifunctional machine is in the waiting mode, except when the machine is not in operation due to a problem or any other situation.

Though the above embodiment has been described taking an example of the copying operation in the digital multifunctional machine, the same process is implemented when image data is input externally, for example when the machine functions as a printer or facsimile machine. In these cases, the sequences shown in FIGS. 6 to 10 and FIGS. 12 and 13 should be modified so that the conditional judgement step 'Copy key actuated?' is replaced by the conditional judgement as to whether an external data print request signal is received and the step for 'Read originals' is omitted.

According to the image processing apparatus of the present invention, the image data stored in the image processing apparatus is automatically erased in accordance with the status of the image processing apparatus. This makes it possible to erase the image information, which has been temporarily stored for processing in the image processing apparatus, efficiently at the best timing. Therefore, it is possible to prevent leakage of confidential information processed by the image processing apparatus and hence improve the standard of security. It is possible to eliminate user's feeling of uneasiness that image data have been left over in the image processing apparatus. It is also possible to eliminate the inconvenience of a next user that the apparatus cannot be used temporarily due to erasing of the image data processed by the previous user.

According to the image processing apparatus of the present invention, in the case where a job interrupt is actuated stopping the job in progress, the timing of erasing the interrupting job data is determined dependent on the interrupting job when the interrupting has been completed. This enables smooth restart of the preceding job or smooth return to the preceding job which has been halted, as soon as the interrupting job is completed. Accordingly, it is possible to efficiently prevent leakage of confidential information and the like whilst suppressing the lowering of the processing efficiency.

According to the image processing apparatus of the present invention, when the amount of data of the interrupting job is lower than a preset amount, the interrupting job data is erased before return to the halted preceding job and when the amount of data of the interrupting job exceeds the preset amount, the preceding job is restarted without erasing the interrupting job data. This enables smooth restart of the preceding job, or smooth return to the preceding job which has been halted, as soon as the interrupting job is completed. Accordingly, it is possible to improve the standard of security whilst suppressing the lowering of the processing efficiency.

According to the image processing apparatus of the present invention, it is possible to select beforehand whether the interrupting job data should be erased first before return to the halted preceding job when the interrupting job has been completed or whether the interrupting job data should be erased together with the preceding job data when the preceding job has been completed. In this way, it is possible to arbitrarily choose based on the usage environment of the image processing apparatus (whether or not information of high confidentiality is often processed), whether priority should be given to the return to the preceding job which has been halted, as soon as the interrupting job is completed, or whether priority should be given to the security by erasing the interrupting job data first before return to the preceding job which has been halted.

According to the image processing apparatus of the present invention, the image data stored in the image processing apparatus is automatically erased when the image processing apparatus has been left inactive for a period equal to or greater than the preset time. In this way, the image data which has been temporarily stored for processing in the image processing apparatus can be erased while the image processing apparatus is left inactive. Therefore, it is possible to inhibit lowering in processing efficiency.

According to the image processing apparatus of the present invention, when the image processing apparatus has been left inactive after the completion of the interrupting job, the interrupting job data is automatically erased and then the preceding job which has been temporarily halted is automatically restarted. This enables smooth restart of the preceding job or smooth return to the preceding job which has been halted, as soon as the interrupting job is completed. Accordingly, it is possible to improve the standard of security whilst suppressing the lowering of the processing efficiency.

According to the image processing apparatus of the present invention, when the image processing apparatus has been left inactive for a predetermined period of time after completion of a job or when an erase command is given after completion of a job, the stored image data is automatically erased. This configuration makes it possible for the user to erase the image data of markedly high confidentiality, left over in the image processing apparatus immediately after the completion of the job. Therefore, it is possible to improve the standard of security.

According to the image processing apparatus of the present invention, if an erasing start command is given when the interruption has been completed, the interrupting job data is erased first and then the preceding job which has been halted is restarted. This configuration makes it possible for the user to erase the image data of markedly high confidentiality, of the interrupting job, immediately after the completion of the interrupting job. Therefore, it is possible to improve the standard of security.

According to the image processing apparatus of the present invention, the image data stored in the image processing apparatus is automatically erased, utilizing the period from the time when the power saving mode is actuated to the time when the operation returns to the normal mode whereby fixing operation is possible. Incidentally, once the power saving mode is actuated in the image processing apparatus, it takes a definite time until the image processing apparatus regains the normal function, hence it is impossible to perform image forming until the image processing apparatus is restored. Therefore, it is possible to inhibit lowering of the processing efficiency of image forming by erasing the image data stored in the image processing apparatus, utilizing the time to return to the normal mode.

According to the image processing apparatus of the present invention, when the job in progress in the image processing apparatus is cancelled, the image data stored therein is automatically erased. Therefore, the image data which is considered to be unnecessary can be erased at once, so that it is possible to improve the standard of security.

According to the image processing apparatus of the present invention, the operation of the image information erasing means is managed by the time slot manager means so that the image data stored temporarily in the image processing apparatus can be automatically erased. This configuration makes it possible to erase the image information which has been temporarily stored for processing in the image processing apparatus, in a systematic manner, whereby it is possible to eliminate user's feeling of uneasiness that image data have been left over in the image processing apparatus as well as to eliminate the inconvenience that the image processing apparatus cannot be used temporarily due to erasing of the image data stored in the storage device.

According to the image processing apparatus of the present invention, the time slot for automatically erasing the image data stored in the image processing apparatus can be determined based on the usage status of the image processing apparatus. Thus, the image processing apparatus by itself systematically performs erasing of the image information which has been temporarily stored for processing therein, whereby it is possible to eliminate user s feeling of uneasiness that image data have been left over in the image processing apparatus as well as to eliminate the inconvenience that the image processing apparatus cannot be used temporarily due to erasing of the image data stored in the storage device.

According to the image processing apparatus of the present invention, the image data which has been temporarily stored for processing in the image processing apparatus can be automatically erased based on the past operational log. Therefore, it is possible to erase the image information which has been temporarily stored for processing therein, whereby it is possible to eliminate user s feeling of uneasiness that image data have been left over in the image processing apparatus. Moreover, it is possible to reduce the inconvenience that the image processing apparatus cannot be used when it is wanted, by allotting the time for erasing the image data stored in the storage so as to overlap the user's usage demands for the image processing apparatus as little as possible.

According to the image processing apparatus of the present invention, if it happens that automatic periodic erasing of the image data stored in the image processing apparatus cannot be implemented because the apparatus is engaged, broken down due to some problem, stopped for check-up or turned off, the image data erasing can be actuated after restoration of the image processing apparatus. Therefore, erasing of image data can be reliably implemented so that it is possible to eliminate user's feeling of uneasiness that image data have been left over in the image processing apparatus.

What is claimed is:

1. An image processing apparatus comprising:
    an image information input means for receiving image information;
    an image information storage means for storing the image information input through the image information input means;
    an image processing means for processing the image information stored in the image information storage means;
    a status manager means for managing the status of the image processing apparatus;
    an image information erasing means for erasing the image information stored in the image information storage means,
    characterized in that the image information erasing means is adapted to erase the image information in accordance with the status of the image processing apparatus managed by the status manager means,
    an interrupt commanding means for giving an order of a job interrupt; and
    an interrupt job monitoring means for monitoring the status of the interrupting job directed by the interrupt command means,
    wherein the status manager means comprises a time counter means for measuring the inactive time in which the image processing apparatus is not operated by users,
    the image information erasing means erases the image information stored in the image information storage means when the inactive time of the image processing apparatus based on the time measured by the time counter means exceeds a predetermined period, and
    if an interrupting job is directed by the interrupt command means before elapse of the predetermined period, the interrupting job is preferentially performed,
    wherein the status manager means comprises an erase command accepting means for accepting a user erase command for erasing the image information stored in the image information storage means, the erase command being manually entered by the user after the image processing means has processed the image information.

2. The image processing apparatus according to claim 1, wherein the image information erasing means erases the image information stored in the image information storage means when the erase command accepting means receives an erase command, while the measured time by the time counter means has not exceed the predetermined period.

3. The image processing apparatus according to claim 1, wherein the status manager means comprises a power source monitoring means for monitoring the status of a power source, and the image information erasing means erases the image information stored in the image information storage means, utilizing the period from the time when actuation of a power saving mode is monitored by the power source monitoring means to the time when the operation returns to a normal mode.

4. The image processing apparatus according to claim 1, wherein the status manager means comprises a cancel command accepting means for accepting a user's cancel command for canceling the operation of the image processing means, and the image information erasing means erases the image information stored in the image information storage means when the cancel command accepting means has received a cancel command.

5. An image processing apparatus comprising:
an image information input means for receiving image information;
an image information storage means for storing the image information input through the image information input means;
an image processing means for processing the image information stored in the image information storage means;
a status manager means for managing the status of the image processing apparatus; an image information erasing means for erasing the image information stored in the image information storage means,
characterized in that the image information erasing means is adapted to erase the image information in accordance with the status of the image processing apparatus managed by the status manager means;
an interrupt commanding means for giving an order of a job interrupt; and
an interrupting job monitoring means for monitoring the status of the interrupting job directed by the interrupt commanding means,
wherein the image information erasing means implements erasure of the image information in accordance with the interrupting job status monitored by the interrupting job monitoring means.

6. The image processing apparatus according to claim 5, wherein when the amount of information of the interrupting job monitored by the interrupting job monitoring means is lower than a preset amount, the image information erasing means erases the image information of the interrupting job stored in the image information storage means before return to the job before interruption; and when the amount of information of the interrupting job monitored by the interrupting job monitoring means exceeds the preset amount, the job before interruption is restored before erasing the image information of the interrupting job.

7. The image processing apparatus according to claim 5, wherein the image information erasing means is constructed such that whether the image information of the interrupting job stored in the image information storage means should be erased first before return to the job before interruption when the interrupting job monitoring means determines that the interrupting job has been completed or whether the job before interruption should be restored first before erasing the image information of the interrupting job, can be selected in advance.

8. The image processing apparatus according to claim 5, wherein the status manager means comprises a time counter means for measuring the inactive time in which the image processing apparatus is not operated by users, the time counter means starts counting from when the interrupting job monitoring means determines that the interrupting job has been completed, and the image information erasing means erases the image information stored in the image information storage means when the inactive time of the image processing apparatus based on the time measured by the time counter means exceeds a predetermined period.

9. The image processing apparatus according to claim 5, wherein the status manager means comprises an erase command accepting means for accepting a user's erase command for erasing the image information stored in the image information storage means, the erase command accepting means accepts an erase command when the interrupting job monitoring means determines that the interrupting job has been completed, and the image information erasing means erases the image information stored in the image information storage means when the erase command accepting means receives an erase command.

10. The image processing apparatus according to claim 5, wherein the status manager means comprises a power source monitoring means for monitoring the status of a power source, and the image information erasing means erases the image information stored in the image information storage means, utilizing the period from the time when actuation of a power saving mode is monitored by the power source monitoring means to the time when the operation returns to a normal mode.

11. The image processing apparatus according to claim 5, wherein the status manager means comprises a cancel command accepting means for accepting a user's cancel command for canceling the operation of the image processing means, and the image information erasing means erases the image information stored in the image information storage means when the cancel command accepting means has received a cancel command.

12. An image processing apparatus comprising:
an image information input means for receiving image information;
an image information storage means for storing the image information input through the image information input means;
an image processing means for processing the image information stored in the image information storage means;
an image information erasing means for erasing the image information stored in the image information storage means; and
a time slot manager means for managing time slots in which the image information erasing means is operated,
said time slot manager means detecting if a predetermined time of day has been reached or detecting if a predetermined continuous idle time period after completion of processing has been reached,
wherein
if said predetermined time of day has been set and is reached, said image information erasing means is operated during a time slot starting at said time to erase the image information stored in the image information storage means, or
if said predetermined continuous idle time period after completion of processing has been set and is reached, said image information erasing means is operated during a time slot starting after said idle time period to erase the image information stored in the image information storage means.

13. The image processing apparatus according to claim 12, wherein the time slot manager means includes an operational status manager means which manages the operational status of the image processing apparatus during its activation to determine the time slots in which the image information erasing means is to be operated.

14. The image processing apparatus according to claim 12, wherein the time slot manager means sets up the time slots in which the image information erasing means is to be operated, based on the past operational log.

15. The image processing apparatus according to claim 12, wherein when the image information erasing means is inoperable, the time slot manager means waits to actuate the image information erasing means until the image processing apparatus permits the image information erasing means to operate.

16. The image processing apparatus according to claim 13, wherein the time slot manager means sets up the time slots in which the image information erasing means is to be operated, based on the past operational log.

17. The image processing apparatus according to claim 13, wherein when the image information erasing means is inoperable, the time slot manager means waits to actuate the image information erasing means until the image processing apparatus permits the image information erasing means to operate.

18. The image processing apparatus according to claim 14, wherein when the image information erasing means is inoperable, the time slot manager means waits to actuate the image information erasing means until the image processing apparatus permits the image information erasing means to operate.

* * * * *